Figure 7:
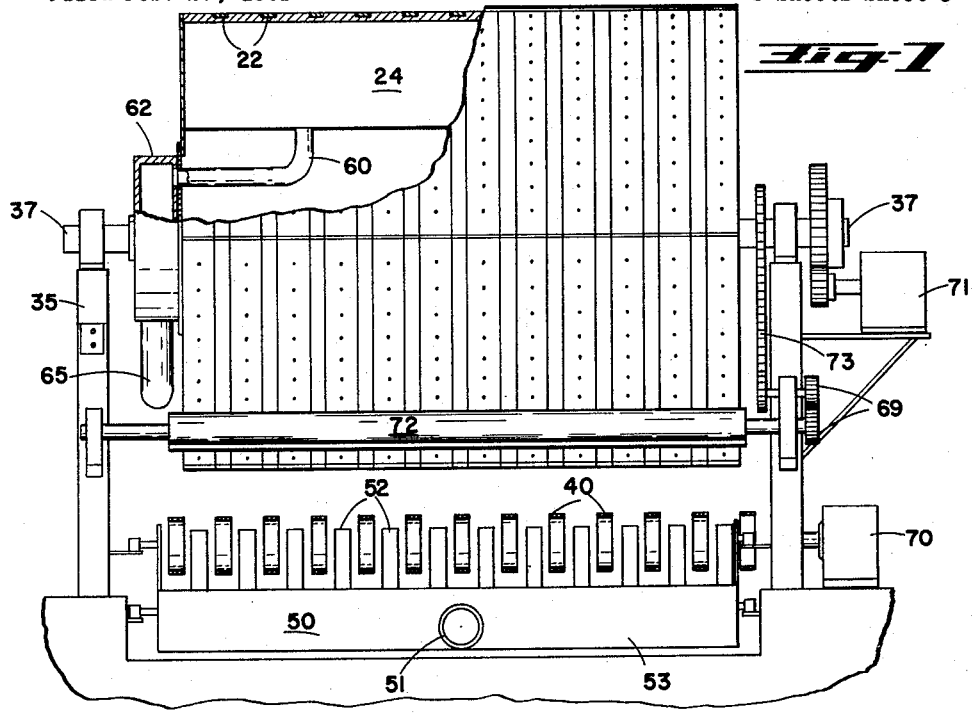

Sept. 1, 1964 P. D. FRIDAY 3,147,166
LAY-UP DRUM MACHINE
Filed Feb. 27, 1961 3 Sheets-Sheet 1
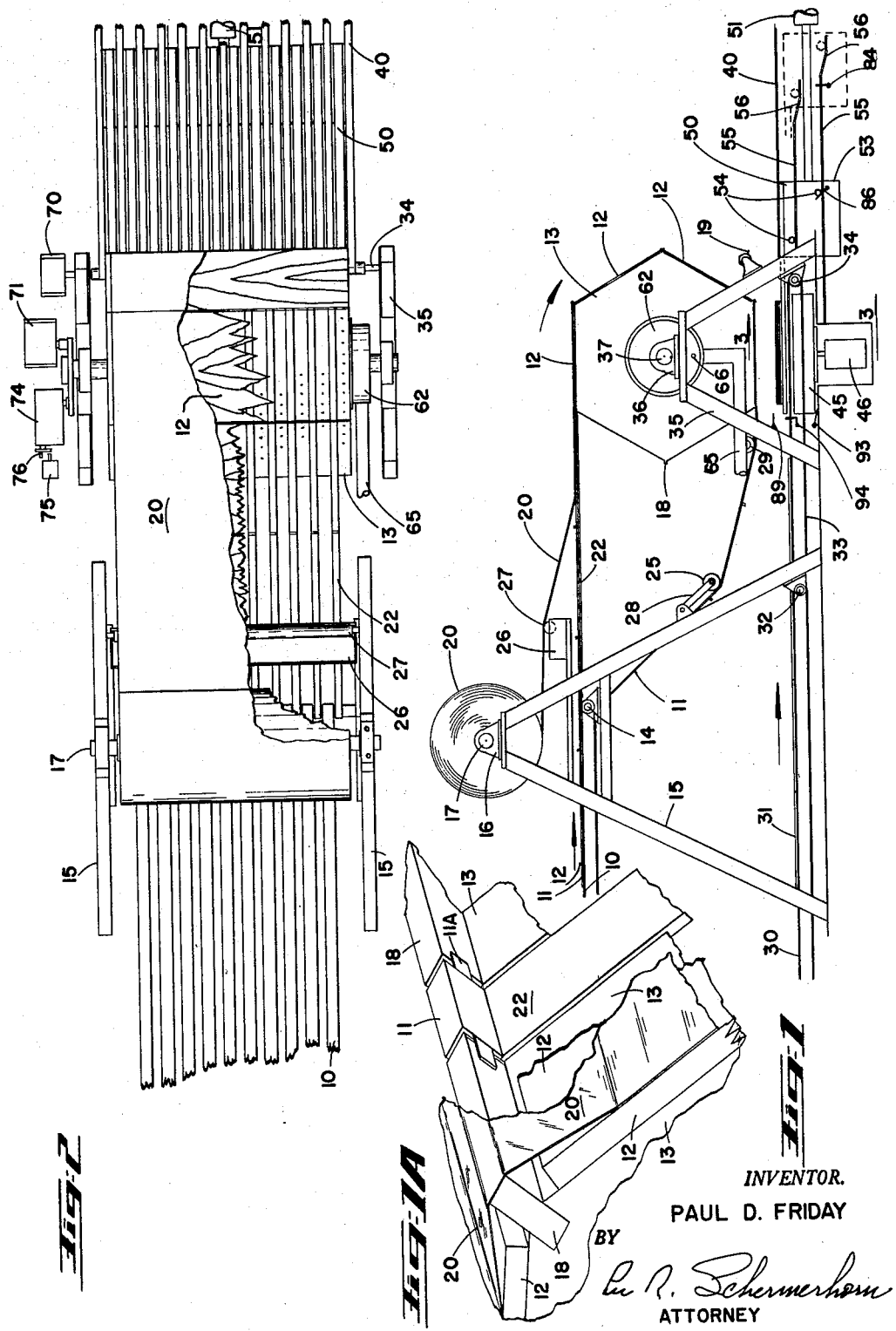
INVENTOR.
PAUL D. FRIDAY
BY
*Lu R. Schermerhorn*
ATTORNEY

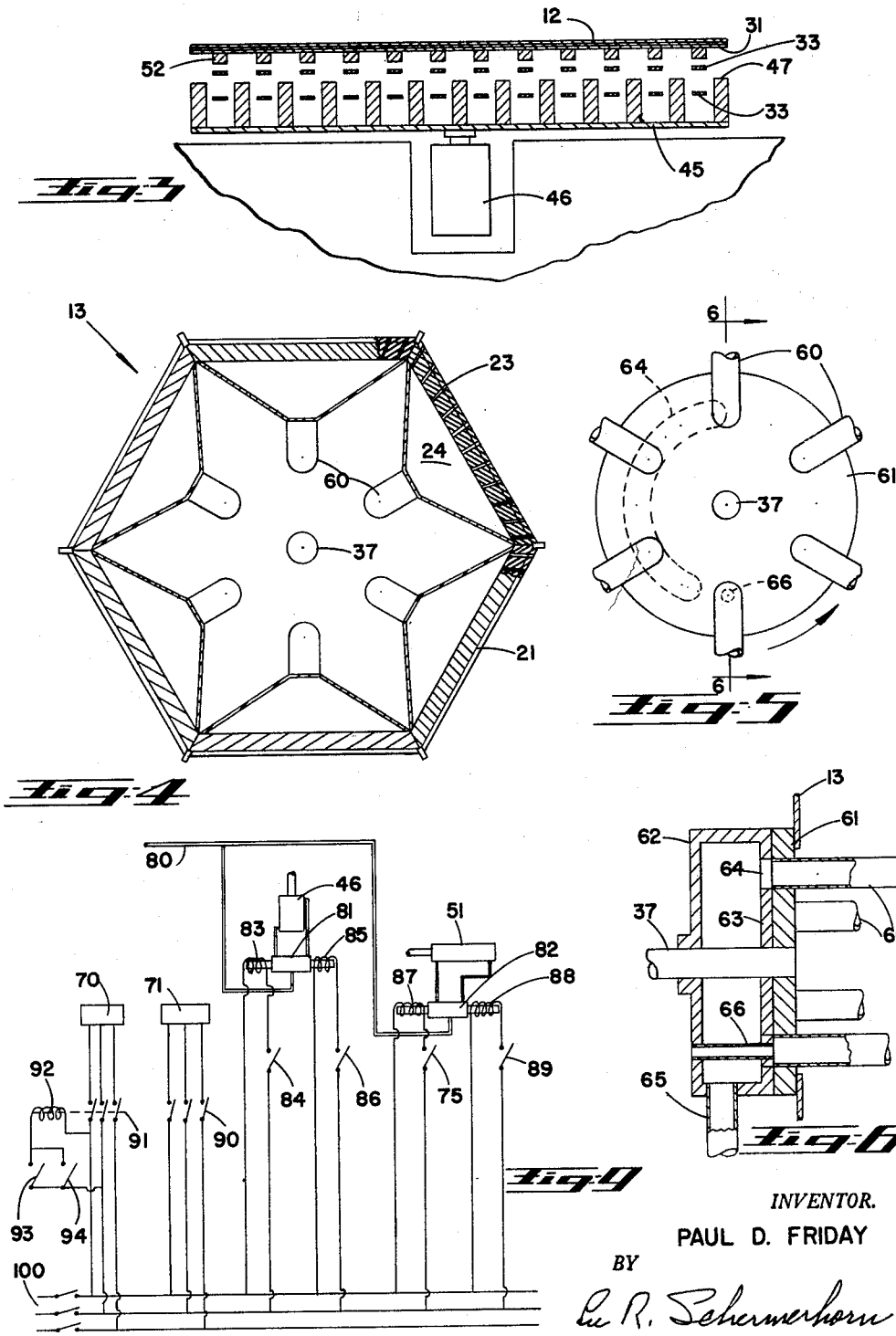

Sept. 1, 1964 P. D. FRIDAY 3,147,166
LAY-UP DRUM MACHINE
Filed Feb. 27, 1961 3 Sheets-Sheet 3

INVENTOR.
PAUL D. FRIDAY
BY
*Lee R. Schermerhorn*
ATTORNEY

United States Patent Office 3,147,166
Patented Sept. 1, 1964

3,147,166
LAY-UP DRUM MACHINE
Paul D. Friday, 4480 SW. Laurelwood Drive,
Portland, Oreg.
Filed Feb. 27, 1961, Ser. No. 92,437
15 Claims. (Cl. 156—264)

This invention relates to a machine for applying glue to sheets of material and then assembling the sheets in sandwiches for introduction into a laminating press. The machine is of general application to a wide variety of materials but is of especial advantage in the laminating of wood veneers to form plywood.

The purpose of the machine is to perform various functions which have heretofore been carried out by hand, thereby saving considerable time and expense in the manufacture of laminated products and achieving a more uniform product of high quality. The present machine performs the glue spreading and lay-up functions necessary for assembling any number of plies, 3, 5 or 7 being customary in the plywood industry. Either one or both of the surface plies may be of a different kind or grade of material than the core ply or plies. This is of particular advantage in making plywood where the face veneer and sometimes also the back veneer are of a better quality or grade of wood than the core veneers.

Objects of the invention are to provide a fully automatic machine to expedite the glue spreading and lay-up steps in the assembling of sandwiches for a laminating press, to provide a machine which will effect a uniform glue spread on all the sheets, to provide a machine which will not apply an excess of glue in knot holes in veneers and to provide a machine capable of handling film glue. In the present machine the lay-up operation is performed by a polygonal drum which is preferably hexagonal in cross section. Each of the six faces of the drum has a length and width corresponding to the dimensions of the sheets which are to be assembled. The core sheets and one outside sheet are fed to the top of the drum in sequence and are held to the flat faces of the drum by vacuum. As the drum rotates, these sheets are deposited one after another on top of another outside sheet supplied by a conveyor beneath the rotating drum. The number of faces on the drum does not limit either the minimum or maximum number of plies which can be assembled; a six sided drum will assemble from two to any number desired by a simple adjustment of the machine.

The machine allows considerable flexibility in the glue spreading operation. Preferably, a continuous web of absorbent tissue paper is drawn over a glue spread roller and around the outside of the drum overlying the sheets secured to the drum faces by suction. The wet glue-saturated paper adheres to the sheets and is cut at each corner of the drum so that each sheet is assembled into the sandwich with a glue-coated layer of paper on one side. The paper is incorporated into the completed panel but does not weaken the panel because there is a continuous glue bond through the porous paper between adjacent sheets. Film glue may be applied in the same manner. Alternatively, the adhesive may be applied by roller coaters or spray coaters either separate from or incorporated in the present machine.

Further details of the machine will be explained and additional objects and advantages will become apparent in the following description of a preferred embodiment of the invention. Various changes may be made, however, in the construction and arrangement of parts and certain features may be used without others. All such modifications within the scope of the appended claims are included in the invention.

Figure 8:
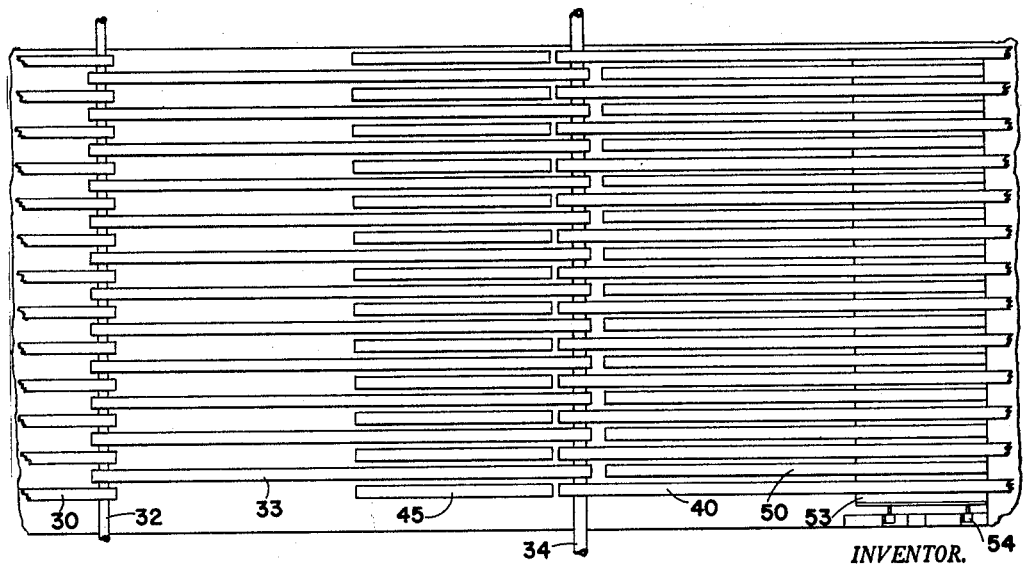

In the drawings:
FIGURE 1 is a side elevation view of the present machine;
FIGURE 1A is a fragmentary enlarged perspective view of one corner of the stacking drum;
FIGURE 2 is a top plan view with parts broken away;
FIGURE 3 is an enlarged sectional view taken on the line 3—3 of FIGURE 1;
FIGURE 4 is an enlarged cross sectional view of the drum;
FIGURE 5 is an enlarged view of the valve arrangement for controlling the drum suction;
FIGURE 6 is a sectional view taken on the line 6—6 of FIGURE 5;
FIGURE 7 is an end elevation view of the machine;
FIGURE 8 is a top plan view of the lower belt system; and
FIGURE 9 is a schematic diagram of the control system for the machine.

General Organization

Referring first to FIGURES 1 and 2, the numeral 10 designates a plural belt upper feed or supply conveyor having lugs 11 to supply sheets 12 to the upper side of a rotating hexagonal drum 13. Conveyor 10 comprises a plurality of endless belts trained around spaced pulleys on a shaft 14 mounted in suitable bearings on a suitable frame such as the A-frame 15. At the top of this frame bearings 16 support the shaft 17 of a roll of tissue paper 20.

The surfaces of drum 13 are provided with belt grooves 21 to receive a plurality of belts 22 trained around the drum with the outer surfaces of the belts flush with the flat faces of the drum. The drum faces between the belt grooves are equipped with suction holes 23 communicating with suction chambers 24 as shown in FIGURE 4 to hold the sheets 12 flat against the drum as the drum rotates. The belts 22 are trained around pulleys on the shaft 14 between the pulleys for the belts of conveyor 10. Drum 13 is rotated continuously to drive the belts 22. Floating belt tightening pulleys 25 accommodate variations in the length of the belt loops during the rotation of drum 13 which operates as a polygonal drive pulley for the belts 22. Pulleys 25 idle on a shaft hung on a pair of pivotal arms 28. Guide pulleys 29 hold the bottom reach of the belts approximately horizontal for stripping the sheets 12 from the under side of the drum.

Each of the six flat drum surfaces is slightly larger than the sheets 12. A standard size for plywood veneers is eight feet long by four feet wide, with excess length and width to allow for trimming. For such purpose the drum would be roughly eight feet long with each drum face roughly four feet wide. In order to index the sheets 12 in register with the drum faces the belts 22 are also equipped with lugs 11 which are synchronized with the lugs on belts 10. The lugs on both sets of belts are spaced and synchronized with the drum so that the lugs on belts 22 will fall on the corners of the drum. Thus, sheets 12 placed between the lugs on belts 10 will register properly with the drum faces when they reach the drum.

Also mounted on the frame 15 is a glue reservoir 26 carrying a glue spreader roll 27 to saturate the tissue web 20 with glue as the web is drawn around drum 13 in contact with the outer surfaces of sheets 12. The wet adhesive on web 20 causes the web to adhere to the sheets.

The corners of the drum are equipped with outstanding bars 18 between the belt grooves 21. These bars stand to the same height as lugs 11 causing the paper 20 to arch across the bars and lugs as shown in FIGURE 1A. Both bars and lugs are preferably made of wood or rubber to provide a yieldable anvil or cutting block under the paper where the paper is engaged by a rotary paper knife 19. Ears 11a on the lugs 11 bear against the forward sides of bars 18 to keep the lugs aligned with the bars and prevent the drum from gradually creeping ahead of the belts. The belts may be geared to the drum by any suitable means, however, and chains may be used, if desired, with sprocket teeth on the drum.

The numeral 30 designates a lower plural belt supply or infeed conveyor for supplying sheets 31 to a stacking station beneath the drum 13. These are smooth belts without lugs trained around spaced pulleys fixed to a shaft 32 mounted in bearings at the bottom of the frame 15. Between these pulleys are additional pulleys fixed to the shaft 32 carrying endless smooth belts 33 which are trained at their trailing ends around pulleys fixed on a shaft 34 mounted in bearings at the bottom of a suitable frame such as the A frame 35. Belts 33 pass under the lower side of drum 13, and shaft 34 is a drive shaft driving the belts 33 and 30. Belts 30 may be driven separately from the belts 33, however, since the latter operate intermittently. The upper end of frame 35 carries bearings 36 to support the drum 37.

Between the pulleys for belts 33 the shaft 34 carries slightly larger idler pulleys for offbearing conveyor belts 40 whereby the supporting surface of belts 40 is slightly higher than the supporting surface of belts 33. These are smooth belts driven continuously by pulleys at their trailing ends, not shown. Shaft 34 is driven intermittently to bring sheets 31 into the stacking station beneath drum 13 one at a time when needed, while the offbearing belts 40 run continuously on the idler pulleys which rotate freely on the shaft 34.

Directly beneath drum 13 is an elevator 45 operated by a lift cylinder 46. Elevator 45 has a fingered platform 47 arranged to pass vertically between the belts 33 as shown in FIGURE 3 whereby the elevator will lift a sheet 31 off the belts 33. Elevator 45 defines the location of the stacking station where sandwiches comprising sheets 12 and 31 are assembled beneath the drum 13. The elevator is guided and stabilized by suitable means to hold it level and prevent it from rotating.

Associated with the offbearing conveyor 40 is a reciprocating offbearing carriage 50 operated by a fluid pressure cylinder 51. Carriage 50 is equipped with platform fingers 52 between the belts 40 and aligned with the belts 33 as shown in FIGURES 3 and 8. These platform fingers extend forward from a carriage frame 53 supported by rollers 54 on tracks 55 as shown in FIGURE 1. These tracks have depressed rear ends 56. Preferably, channel tracks are used for the rear rollers to prevent uplift since the platform fingers 52 are cantilever beams which carry the load forward from the carriage frame 53 and its supporting rollers. For convenience of illustration, the channel form of the track elements is not shown in the drawing.

When carriage 50 is in its forward or loading position, the platform fingers 52 extend over the belts 33 directly beneath drum 13 in the stacking station and support the sandwich of sheets 31 and 12 during lay-up. At the instant when carriage 50 moves forward to this lay-up position, the elevator 45 is holding a sheet 31 above the level of carriage platform fingers 52 whereby these platform fingers pass between the elevator platform fingers 47 and beneath the sheet 31 resting thereon. The elevator then descends, transferring the sheet 31 to the carriage, leaving the parts in the positions shown in FIGURE 3.

The lay-up of the sandwich may start on the elevator, before the carriage arrives in the stacking station, but in any event, the lay-up is completed on the platform fingers 52 of carriage 50. When the lay-up of a sandwich is completed, carriage 50 is retracted rearwardly from beneath the drum 13 and clear of the trailing ends of belt 33. The depressed rear ends 56 of the tracks 55 then lower the carriage without tilting so that its platform fingers 52 descend below the top supporting surface of offbearing belts 40. The sandwich is thereby transferred to belts 40 and carried away to a convenient position for insertion in the laminating press. Elevator 45 can then lift another sheet 31 from the belts 33 and hold it in readiness for the return of carriage 50. Transfer of sheet 31 to the carriage may be effected either before a sheet 12 drops onto the sheet 31 or at any time prior to completion of the lay-up of the sandwich assembly. The speeds of the elevator and carriage movements are readily controlled by valves in the fluid pressure lines connected to the operating cylinders. The carriage may be actuated by any other suitable means, if desired, such as a rack and pinion.

*The Rotating Drum*

Each suction chamber 24 in FIGURE 4 communicates with a pipe 60 leading to a circular seal plate 61 on one end of the drum, as shown in FIGURES 5, 6 and 7. A stationary circular suction box 62 has an end seal plate 63 which wipes the plate 61 as the latter rotates with the drum. Plate 63 is equipped with an arcuate opening or slot 64 which is positioned to communicate with each pipe 60 as the corresponding suction chamber rotates from its upper horizontal position to its lower horizontal position. Thus, suction is applied to the suction chambers 24 during the time the belts 22 are in contact with the corresponding drum faces. Sub-atmospheric pressure is maintained in the suction box 62 by means of a pipe 65 leading to a vacuum pump.

In FIGURE 1, suction is just being initiated on the top face of the drum and suction has just been terminated on the bottom face of the drum. When each drum face reaches bottom position the sheet thereon is stripped from the drum at the proper time by the positive action of belts 22 as the drum face rotates away from the plane of the bottom reach of these belts. An atmospheric air vent connection 66 is provided in seal plate 63 just beyond the end of slot 64 to admit atmospheric pressure to the lowermost suction chamber 24 and quickly release the hold on the sheet as stripping commences. Suitable guides may be provided to guide the falling sheets into a neat stack on the bottom sheet 31.

Referring now to FIGURES 2 and 7, shaft 34 controlling the operation of conveyor belts 30 and 33 is driven intermittently by an electric motor 70, it being remembered that the offbearing belts 40 run continuously on idler pulleys on shaft 34 regardless of whether or not the motor 70 is operating. Drum shaft 37 is driven continuously by electric motor 71 when the machine is operating.

The rotating clipper knife 19 is mounted in bearings on the frame 35 to cut the paper 20 between panels 12. This knife is driven by chain 73 and gears 69 from drum shaft 37 in timed relation with the drum so that the knife cuts the paper at each corner of the drum on the bars 18 and belt lugs 11. Thus, the knife rotates six times for each rotation of drum 13.

Also geared to drum shaft 37 is an adjustable gear box 74 for actuating a switch 75. The output shaft of gear box 74 is equipped with a cam or crank pin 76 which momentarily closes the switch 75 once in each rotation of the output shaft. Suitable means are provided in gear box 74 for adjusting the driving ratio between drum shaft 37 and crank pin 76 so that the switch 75 will be actuated when a selected number of sheets 12 have been stripped from the drum, this gear ratio determining the number of sheets in the lay-up of sandwich formed in the stacking station. The actuation of switch 75 causes the sandwich to be removed from the stacking station and new bottom sheet 31 to be brought in.

For a two-ply lay-up, consisting of one sheet 31 and one sheet 12, crank pin 76 would make six revolutions for each rotation of drum shaft 37. For a three-ply lay-up, consisting of one sheet 31 and two sheets 12, the ratio would be 3 to 1, for a five-ply lay-up 3 to 2, seven-ply 1 to 1, nine-ply 3 to 4, etc. It is to be noted in this connection that the number of sides on the drum imposes no limitation on the possible number of plies in the sandwich, the drum being capable of depositing any desired number of sheets 12 on each bottom sheet 31, subject to the amount of clearance space available in the stacking station under the drum. The sandwiches may contain an even number of plies as well as an odd number but, in the case of wood veneers, an odd number is always used in order to obtain lengthwise grain on both face sheets. The desired changes in gear ratio may be effected by the use of interchangeable gears or by a gear shifting mechanism as is well understood in the art. The drum may have any desired number of sides.

Control System

The elevator lift cylinder 46 and carriage traverse cylinder 51 are operated from a compressed air supply as shown in FIGURE 9, under the control of solenoid valves 81 and 82. The cylinders are double acting and the valves may be a conventional sliding spool-type of balanced valve arranged to connect the source of fluid pressure with either end of the cylinder. When solenoid 83 is energized by closing switch 84, the spool valve is shifted to the left connecting the source of pressure with the lower end of cylinder 46 causing the elevator to rise. When solenoid 85 is energized by the closing of switch 86, the spool valve is shifted to the right connecting the upper end of the cylinder with the source of pressure causing the elevator to descend.

Similarly, when solenoid 87 is energized by the closing of switch 75, the spool valve 82 is shifted to the left connecting the source of pressure with the left end of cylinder 51 to move offbearing carriage 50 to the right in FIGURE 1. When solenoid 88 is energized by the closing of switch 89, this spool valve is shifted to the right connecting the source of pressure with the right end of cylinder 51 which returns carriage 50 to the left in FIGURE 1. The spool valves 81 and 82 are balanced valves whereby they remain in actuated position without requiring continuous energization of the respective solenoids. Thus, the control switches 84, 86, 75 and 89 may be normally open switches which are closed only momentarily in the operation of the machine and then reopened. Valves 81 and 82 include relief ports for exhausting the end of each cylinder toward which its piston is moving.

In order to synchronize the lugs 11 on belts 10 and 22 so that these lugs will arrive on the upper side of shaft 14 at the same time, the belts 10 may be driven by a synchronous motor and the drum motor 71 may be a similar synchronous motor which runs at precisely the same speed.

Drum motor 71 is started and stopped by a manual switch 90. Conveyor motor 70 is controlled by a relay switch 91 which is actuated by a solenoid 92. This switch is biased to a normally open position and is closed only when one or the other of the two switches 93, 94 is closed. Switches 93 and 94 are biased to normally open positions and are closed only momentarily to bring a new bottom sheet 31 into the stacking station. The whole electrical system is energized from a source of supply 100.

The locations of the control switches in FIGURE 9 are all shown in FIGURE 1 except for switch 75 which appears in FIGURE 2.

Operation

Assuming a sandwich lay-up of more than two plies to be in progress on carriage 50, the latter will be to the left in FIGURE 1 under the drum 13 which will be rotating and stacking sheets 12 glue side down on a dry bottom sheet 31 on the carriage. Elevator 45 will be down and another bottom sheet 31 will be resting on the belts 33 above the elevator and beneath carriage 50. Belts 30 and 33 will be at rest and belts 10, 22 and 40 will be running. Switch 90 in FIGURE 9 will be closed and switches 75, 84, 86, 89, 91, 93 and 94 will all be open.

As drum 13 rotates, clipper knife 19 cuts the paper 20 at the corners of the drum between sheets 12 and these sheets with the glue soaked paper 20 adhering thereto are stripped from the drum by belts 22 so that they drop one by one on top of each other on the pile being formed on carriage 50. When the last of the predetermined number of sheets in the sandwich is thus dropped, crank pin 76 momentarily closes switch 75 energizing solenoid 87 and shifting the valve 82 to direct fluid pressure into the left end of cylinder 51. This causes carriage 50 to be traversed to the right in FIGURE 1 carrying with it a completed sandwich consisting of a bottom sheet 31 and the predetermined number of sheets 12 each carrying a glue soaked paper 20 on its under side. When the stack or sandwich has cleared drum 13, the carriage engages and momentarily closes switch 84 to raise the elevator 45. As the carriage moves to the right it clears the ends of belts 33 and descends on the depressed ends 56 of its tracks 55 to deposit the completed sandwich on offbearing conveyor belts 40. Switch 75 meanwhile has re-opened but valve 82 remains in its actuated position to hold carriage 50 to the right in FIGURE 1. Switch 84 also re-opens leaving valve 81 in actuated position.

As elevator 45 rises it picks up the sheet 31 waiting on belts 33 and lifts this sheet above the belts. As the elevator approaches its upper position it momentarily engages and closes switch 89 to energize solenoid 88 of the valve 82 which causes carriage 50 to be shifted back to the left in FIGURE 1 with the platform fingers 52 passing under the sheet 31 on the elevator. As carriage 50 approaches this position, it momentarily engages and closes switch 86 which energizes solenoid 85 of valve 81 causing the elevator to be lowered, transferring the sheet 31 to the carriage platform fingers 52 as shown in FIGURE 3. The above-described sequence of operations takes place while the next sheet 12 on drum 13 is rotating down to stripping position but it is not necessary for the carriage to have completed its return movement under the drum because the drum can begin stacking sheets 12 while bottom sheet 31 is still on the elevator. Thus, there is no urgency in the return movement of the carriage except that it must arrive before the last sheet 12 of the sandwich is dropped from the drum. This last sheet is the top face sheet whereby it will be apparent that in loading the infeed conveyor 10 the proper number of core sheets must be interposed between successive face sheets.

As elevator 45 descends below the top supporting surface of belts 33, it momentarily engages and closes switch 93 to start conveyor motor 70. This moves a new bottom sheet 31 into pick-up position above the elevator. Before switch 93 re-opens as the elevator approaches bottom, the leading edge of the oncoming bottom sheet 31 engages the actuating arm of switch 34 to provide a holding circuit for solenoid 92 of the motor relay switch 91. Thus, the conveyor motor 70 remains energized to keep the belts 33 moving until the trailing edge of the sheet 31 releases the actuating arm of switch 94, allowing this switch to re-open. Now both of switches 93 and 94 are open, deenergizing relay solenoid 92 and opening the circuit to motor 70 to stop the belts 33.

Suitable stop means are provided to arrest the movement of bottom sheet 31 in proper position for pick-up by the elevator to allow for over-travel of the belts 33 after the motor has been deenergized. The smooth belts merely slide under the sheet 31 until they come to rest, thus making it unnecessary to stop the motor quickly. With the deenergization of motor 70 the cycle is completed and a new cycle is in progress as the drum proceeds to lay-up a new sandwich. The cycle repeats automatically as long as the conveyors 10 and 30 are supplied with sheets 12 and 31.

The present machine is quite flexible in regard to the application of adhesive. For example, film glue may be substituted for the paper web 20 and glue spread roller 27. If the upper surfaces of sheets 12 are moistened on the conveyor 10, film glue may be fed around the drum the same as paper 20, the moisture causing the film to adhere to the sheets. The term "glue web" is used in the appended claims as a generic term covering both film glue and glue-saturated paper.

Alternatively, adhesive may be sprayed on the upper surfaces of sheets 12 as they travel on conveyor 10 or it can be rolled on with a gluing roll either while the sheets are on conveyor 10 or as they rotate past a given line on the surface of the drum. In some cases it may be found expedient to use sheets 12 which are pre-coated with adhesive.

Having now described my invention and in what manner the same may be used, what I claim as new and desire to protect by Letters Patent is:

1. The method of laying up sheets of material for a laminating press comprising disposing a bottom sheet in a receptive position, rotating a series of other sheets one after another to inverted position above said bottom sheet, pulling a continuous glue web around the outer faces of said rotating sheets, cutting said web between said sheets, and dropping said inverted sheets with said glue web adhering thereto in a stack on said bottom sheet.

2. The method of claim 1 wherein said glue web comprises a ribbon of paper saturated with glue.

3. The method of claim 1 wherein said glue web comprises a ribbon of film glue.

4. A machine for laying up sheets of material for a laminating press comprising a stacking station, means for feeding bottom sheets to a stationary position in said stacking station, means for applying glue to the upper faces of a series of other sheets, means for rotating said series of other sheets in flat condition one after another to inverted position, means for stripping said sheets from said rotating means and dropping said sheets in a stack on each bottom sheet, means for moving said stacks out of said stacking station, and means controlled by said rotating means for operating said feeding means and stack moving means when a predetermined number of sheets have been dropped.

5. A machine for assembling sheets in a sandwich for a laminated product comprising a rotating drum, means for feeding sheets to the surface of said drum, means for holding the sheets on said drum surface, means to feed a continuous glue web around said drum overlying the sheets thereon, means to cut said web between said sheets, means for feeding other sheets to a position beneath said drum, and means for releasing said sheets from said drum to drop the sheets in a stack beneath said drum.

6. In a machine for laying up sheets of material for a laminating press, a stacking drum arranged to receive said sheets one after another around a portion of the periphery of said drum and then drop said sheets in a stack under said drum, means to feed a continuous ribbon of paper around said portion of said drum overlying said sheets on the drum, means for saturating said paper with glue, and means for cutting said paper on said drum between said sheets.

7. A machine for laying up sheets of material for a laminating press comprising a polygonal rotating drum, means for feeding sheets to a stationary stacking station beneath said drum, means for feeding other sheets to the faces of said drum as said faces turn upward, means for securing said sheets to said faces as said faces turn downward, means for stripping said sheets from the drum faces on the under side of the drum so that said released sheets will stack on top of a sheet introduced into the stacking station by said first feeding means, means for removing the stacked sheets from said stacking station, and means controlled by rotation of said drum to operate said first feeding means and said stack removing means when a predetermined number of sheets have been stacked.

8. A machine for laying up sheets of material for a laminating press comprising a polygonal rotating drum having apertured suction faces, means for feeding sheets to a stacking station beneath said drum, means for feeding sheets to said drum faces as said faces turn upward on top of the drum, means for feeding a glue web around said drum and said sheets on said faces, means for cutting said web between said sheets on said faces, and means for releasing said sheets from said faces on the under side of said drum.

9. A machine for laying up sheets of material for a laminating press comprising a polygonal rotating drum having apertured suction faces, and belts trained around said drum arranged to feed sheets to said faces on top of the belts as the faces pass over the top side of the drum and to strip said sheets from said faces as the faces pass under the bottom side of said drum.

10. A machine for laying up sheets of material for a laminating press comprising a polygonal rotating drum having faces with suction apertures, belt grooves around said drum in said faces, endless conveyor belts in said grooves having a horizontal approach to the top side of said drum for feeding sheets to said faces overlying said belts, valve means for cutting off suction to said apertures when said faces reach bottom position on said drum, and guide means for portions of said belts leaving the under side of said drum causing said belts to strip said sheets from said faces.

11. A machine for laying up sheets of material for a laminating press comprising a rotatable polygonal drum having apertured suction faces, means for feeding sheets to said faces on the top side of said drum, a conveyor for feeding bottom sheets to a stacking station beneath said drum, an elevator beneath said drum movable vertically through said conveyor to lift a bottom sheet off said conveyor, and a carriage platform movable above said conveyor and under a bottom sheet on said elevator to support the bottom sheet in position to receive sheets from the bottom of the drum when the elevator is lowered.

12. A machine for laying up sheets of material for a laminated product comprising a continuously rotating stacking drum, belts around said drum arranged to feed core and top sheets to the top side of said drum and strip said sheets from the bottom side of said drum, an infeed conveyor arranged to feed bottom sheets under said drum, an elevator under said drum arranged to rise through said conveyor to lift a bottom sheet off said conveyor, and a carriage movable above said conveyor and under a bottom sheet on said elevator to support the bottom sheet in position to receive core and top sheets from the bottom of the drum when the elevator is lowered.

13. The method of laying up sandwiches of sheet material for a laminating press comprising feeding a bottom sheet substantially horizontally in a lower line of travel to a stationary receptive position, arranging a series of core and top sheets in predetermined sequence in an upper line of travel, feeding said series of core and top sheets one after another with one face uppermost toward a position above said bottom sheet, applying glue to the upper faces of said core and top sheets, rotating said core and top sheets one after another to inverted position above said bottom sheet, holding said core and top sheets flat while being inverted, dropping the inverted core and top sheets on said bottom sheet one on top of another to form a sandwich, moving said sandwich away from said receptive position after each top sheet has been dropped, and feeding another bottom sheet substantially horizontally in said lower line of travel to said receptive position to start another sandwich.

14. A machine for laying up sandwiches of sheet material for a laminating press comprising a polygonal rotating drum on a horizontal axis having faces with suction apertures, belt grooves around said drum in said faces, endless conveyor belts in said grooves having an approximately horizontal approach to the top side of said drum for feeding core and top sheets to said faces overlying said belts, valve means for cutting off suction to said apertures when said faces reach bottom position on said drum, guide means for portions of said belts leaving the under side of said drum causing said belts to strip said sheets from said faces on the under side of the drum, a stacking station beneath said drum, and means for feeding bottom sheets to said stacking station for receiving said core and top sheets on top thereof.

15. A machine as defined in claim 14, said means for feeding said bottom sheets comprising a conveyor having spaced parallel infeed belts extending under said drum; an elevator under said drum having platform fingers below said belts arranged to rise between said belts and lift a bottom sheet off said belts; and said stacking station comprising a carriage having platform fingers movable above said belts and under a sheet on said elevator platform fingers, said elevator platform fingers being movable downward to deposit said bottom sheet on said carriage platform fingers for receiving said core and top sheets.

References Cited in the file of this patent

UNITED STATES PATENTS

| | | |
|---|---|---|
| 355,322 | Johnson | Jan. 4, 1887 |
| 1,329,402 | Henning | Feb. 3, 1920 |
| 1,711,647 | Milmoe | May 7, 1929 |
| 1,838,200 | Tomtlund | Dec. 29, 1931 |
| 1,957,621 | Styron | May 8, 1934 |
| 2,191,070 | Cone | Feb. 20, 1940 |
| 2,209,765 | Cormack | July 30, 1940 |
| 2,323,105 | Welch | June 29, 1943 |
| 2,734,843 | Steele | Feb. 14, 1956 |

FOREIGN PATENTS

| | | |
|---|---|---|
| 79,595 | Norway | Jan. 14, 1952 |